(12) United States Patent
King et al.

(10) Patent No.: US 6,281,598 B1
(45) Date of Patent: Aug. 28, 2001

(54) METHOD AND SYSTEM FOR PREDICTING INCIPIENT FAILURE IN A LOCOMOTIVE ENERGY STORAGE UNIT OR ENERGY STORAGE UNIT CABLING

(75) Inventors: Robert Dean King, Schenectady; Rudolph Alfred Albert Koegl, Niskayuna, both of NY (US); Kristofor Lynn Redinger, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/340,827

(22) Filed: Jun. 28, 1999

(51) Int. Cl.$^7$ ........................................ B60L 1/00
(52) U.S. Cl. ...................... 307/10.1; 701/29; 340/511
(58) Field of Search ...................... 307/9.1, 10.1; 362/61; 188/3 R, 34, 112 R; 105/61; 340/507, 511, 509, 933; 701/19, 29

(56) References Cited

U.S. PATENT DOCUMENTS 4,320,333 * 3/1982 Hase ........................................ 320/43
5,739,670 * 4/1998 Brost et al. ............................ 320/14
6,094,617 * 7/2000 Lapke .................................... 701/104

* cited by examiner

*Primary Examiner*—Josie Ballato
*Assistant Examiner*—Sharon Polk
(74) *Attorney, Agent, or Firm*—Ann M. Agosti; Jill M. Breedlove

(57) ABSTRACT

One method for predicting incipient failure includes starting an engine of a locomotive; obtaining charge current sample values of the energy storage unit during energy storage unit charging at a predetermined rate for a predetermined period of time; calculating an average value of the charge current sample values; and using the average value of the charge current sample to predict incipient failure in the energy storage unit or the energy storage unit cabling. A related method includes obtaining crank voltage sample values of the energy storage unit during cranking; calculating an average value of the crank voltage sample values; and using the average value of the crank voltage sample to predict incipient failure in the energy storage unit or the energy storage unit cabling.

35 Claims, 5 Drawing Sheets

METHOD AND SYSTEM FOR PREDICTING INCIPIENT FAILURE IN A LOCOMOTIVE ENERGY STORAGE UNIT OR ENERGY STORAGE UNIT CABLING

BACKGROUND OF THE INVENTION

Locomotives are required by law to be inspected once every ninety-two days. During an inspection, failure to detect degrading components in a locomotive's electrical cranking system may result in a failure in the following ninety-two day period. A defect in a locomotive cranking system requires additional labor at the railroad's maintenance facility. If a failure in the energy storage unit or energy storage unit cabling occurs on a railroad track during a mission while pulling rail cars, such failure can stop rail traffic on a set of tracks until the locomotive is serviced. Each mission failure is estimated to cost a railroad in excess of ten thousand US dollars.

BRIEF SUMMARY OF THE INVENTION

Thus there is a particular need for a method and system to detect incipient failure of a locomotive energy storage unit and/or high power interface cables that connect the energy storage unit to the locomotive cranking system.

Briefly, in accordance with one embodiment of the present invention, a method for predicting incipient failure in a locomotive energy storage unit or energy storage unit cabling comprises starting an engine of the locomotive; obtaining charge current sample values of the energy storage unit during energy storage unit charging at a predetermined rate for a predetermined period of time; calculating an average value of the charge current sample values; and using the average value of the charge current sample values to predict incipient failure of the locomotive energy storage unit or energy storage unit cabling.

In accordance with another embodiment of the present invention, a method for predicting incipient failure in a locomotive energy storage unit or energy storage unit cabling comprises obtaining crank voltage sample values of the energy storage unit during cranking of an engine of the locomotive; calculating an average value of the crank voltage sample values; and using the average value of the crank voltage sample values to predict incipient failure of the locomotive energy storage unit or energy storage unit cabling.

In accordance with another embodiment of the present invention, a method for predicting incipient failure in a locomotive energy storage unit or energy storage unit cabling comprises prior to energizing (cranking or jogging) an engine of the locomotive, obtaining pre-energized current and voltage sample values of the energy storage unit and calculating an average value of the pre-energized current sample values and an average value of the pre-energized voltage sample values. Then, while energizing the engine, energized current and voltage sample values of the energy storage unit are obtained, and average values of the energized current sample values and energized voltage sample values are calculated. This embodiment further includes subtracting the average value of the pre-energized current from the average value of the energized current to calculate a delta current value, subtracting the average value of the pre-energized voltage from the average value of the energized voltage to calculate a delta voltage value, dividing the delta voltage value by the delta current value to calculate an effective impedance, and using the effective resistance to predict incipient failure of the locomotive energy storage unit or energy storage unit cabling.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
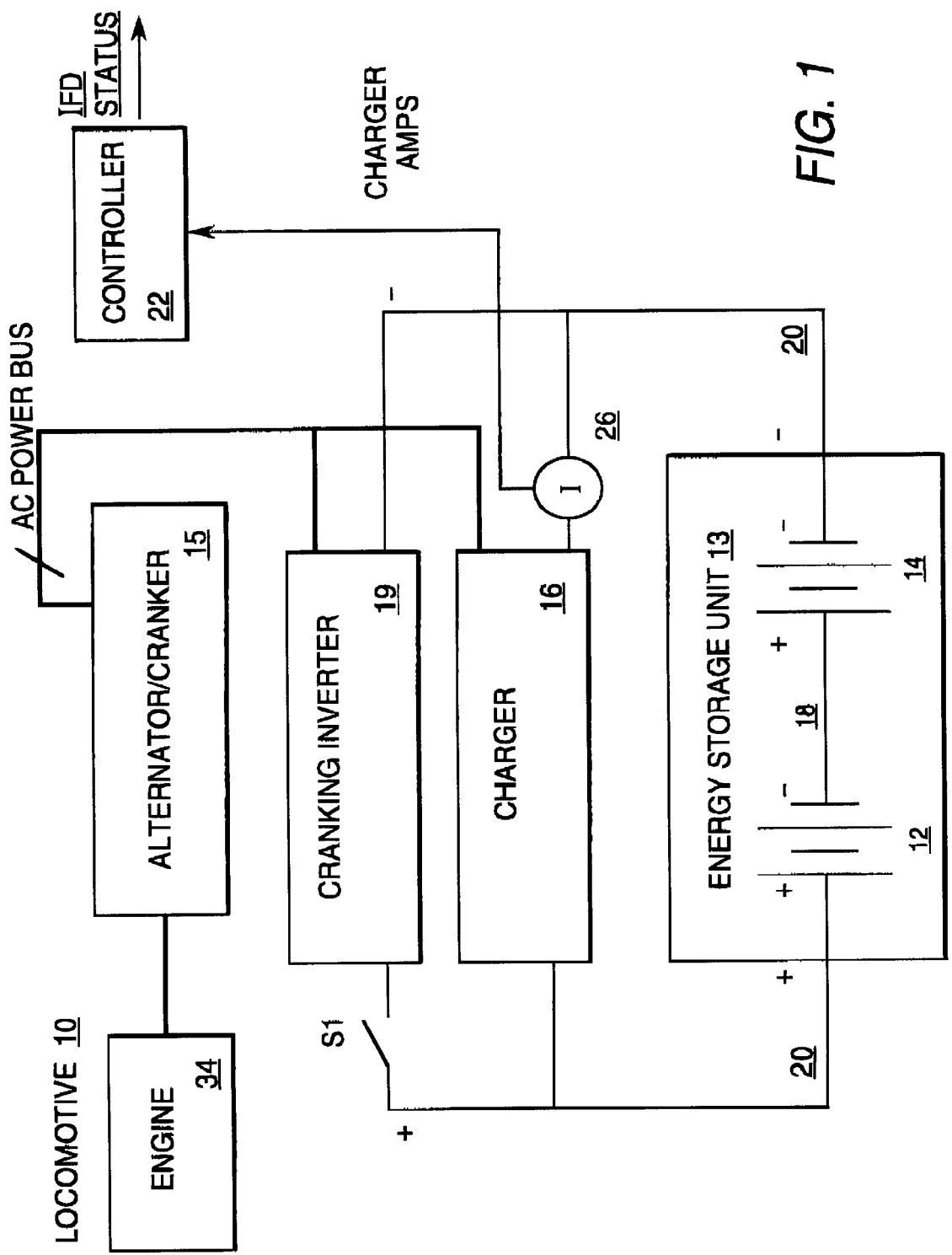
FIG. 1 is a block diagram of one embodiment of the present invention wherein charging current is obtained and used for incipient failure detection (IFD).

In the apparatus of FIG. 1, one embodiment of the present invention is illustrated by a block diagram. In this embodiment, charging current is obtained and used for incipient failure detection (IFD).

In this embodiment, a locomotive 10 includes an engine 34, an alternator/cranker 15, a cranking inverter 19, a charger 16, an energy storage unit 13, associated energy storage unit cabling 18 and 20 and a controller 22. After the engine is cranked, charge current sample values of the energy storage unit are obtained during energy storage unit charging at a predetermined rate for a predetermined period of time. The controller calculates an average value of the charge current sample values and uses the average value to predict incipient failure of the locomotive energy storage unit or energy storage unit cabling. Energy storage unit 13 includes at least one individual energy storage unit 12 or 14 and may comprise a plurality of (two or more) individual energy storage units as well as associated external cabling 20 and any associated internal cabling 18 between multiple individual energy storage units 12 and 14 as shown in FIGS. 1–3 and 6. In one embodiment, each of the one or more individual energy storage units comprises a battery such as a lead acid battery or a nickel cadmium battery, for example. Other types of energy storage units applicable in the present invention may include capacitors or ultracapacitors, for example. In some embodiments, capacitors or ultracapacitors are used in combination with one or more batteries.

Charger 16 generally comprises a module including an algorithm for determining the appropriate level of current to supply to energy storage unit 13 based on the voltage of energy storage unit 13.

Controller 22 may comprise one or more computers and/or microprocessors, for example. In one embodiment, the controller provides an IFD status signal which may result in illuminating a light, closing a contact, or performing some other function to indicate the battery cranking capability. In another embodiment, for example, the controller sends a message via a communication port to another remote computer, a local computer, an embedded computer or microprocessor which indicates or performs some action based on the battery cranking capability.

In one embodiment, a current sensor 26 is used to obtain the charge current sample values. Current sensor 26 may be either a separate current sensor or a current sensor determination algorithm situated within charger 16. Preferably low pass filters (not shown) are used with all sensors in the embodiments of the present invention to remove extraneous signals.

The charge current samples are obtained for the predetermined period of time due to the initial capacitive effects of the energy storage unit which are reduced over time. In one embodiment, for example, the predetermined rate comprises a sampling rate of about 1 Hz and the predetermined period of time comprises about 10 seconds. The controller may analyze the average value of the charge current samples by any of a number of analysis techniques. For example, in one embodiment, the average value can be compared with at least one predetermined threshold value. The average value of the charge current samples being below the predetermined threshold value serves to indicate that either the energy storage unit has a high internal impedance and/or the cabling has a high impedance.

In another embodiment, or in combination with the above embodiment, the controller may include algorithms for trending successive average values of the charge current sample values. Such trending algorithms may include algorithms for monitoring the slope in an individual measurement sequence, monitoring changes in successive measurement sequences, and/or performing regression analysis for predicting time to failure. In this embodiment, and in the embodiments of FIGS. 2, 3, and 6, any of a number of trending or evaluation techniques can be used to evaluate the calculated parameters.

Figure 2:
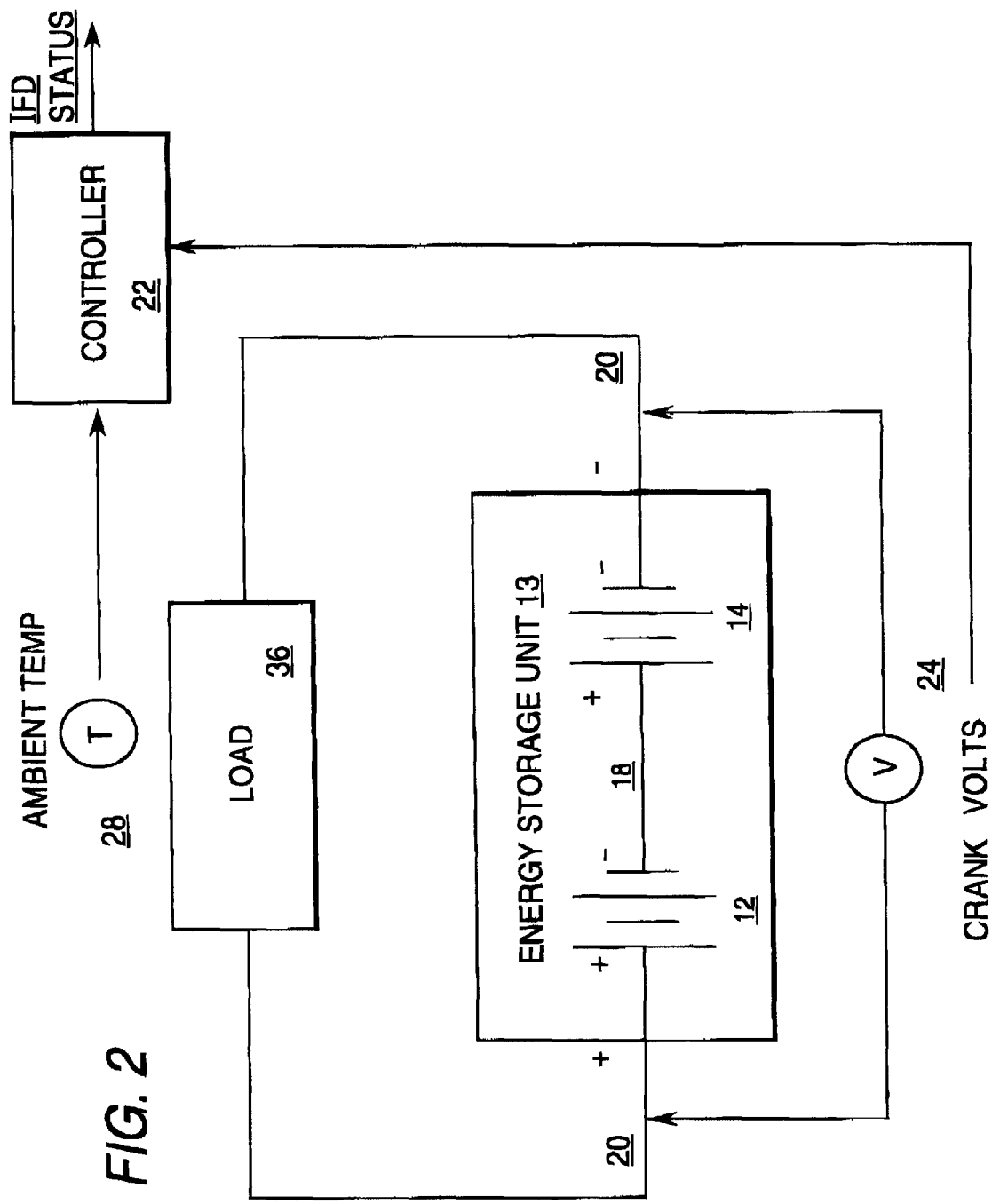
FIG. 2 is a block diagram of another embodiment of the present invention wherein cranking voltage is obtained and used for IFD.

FIG. 2 is a block diagram of another embodiment of the present invention wherein a cranking voltage is obtained and used for IFD. In this embodiment, voltage can be measured with a voltage sensor 24 positioned across energy storage unit 13, for example.

FIG. 2 illustrates a load 36 across energy storage unit 13. Load 36 comprises a load representing engine electronics, fuel injectors, data acquisition units, and locomotive cranking inverter, cab fans, lights, and computers, for example.

Crank voltage sample values of the energy storage unit during cranking of engine 34 are transmitted to controller 22 which calculates an average value of the crank voltage sample values and uses the average value to predict incipient failure of the locomotive energy storage unit or energy storage unit cabling. Preferably, at least one ambient temperature sample value is obtained during engine cranking and used to adjust at least one of the crank voltage sample values. In one embodiment, a temperature sensor 28 is used to measure the ambient temperature in close proximity to the energy storage unit. The appropriate temperature adjustment will depend on the specific design of the locomotive, energy storage unit, and the operating conditions. In one example, a crank voltage sample value is adjusted by subtracting a multiple of a constant K and the ambient temperature.

As discussed with respect to FIG. 1, the controller may analyze the average value by any of a number of analysis techniques. For example, the controller can compare the average value with at least one predetermined value. Alternatively or additionally, the controller can trend the average values of the crank voltage sample values over a number of engine crank sequences to aid in failure prediction.

In one embodiment, the controller further calculates a standard deviation of the crank voltage sample values and trends the standard deviation of the crank voltage sample values over the engine crank sequences. Such trending can be performed using regression analysis, for example.

Figure 3:
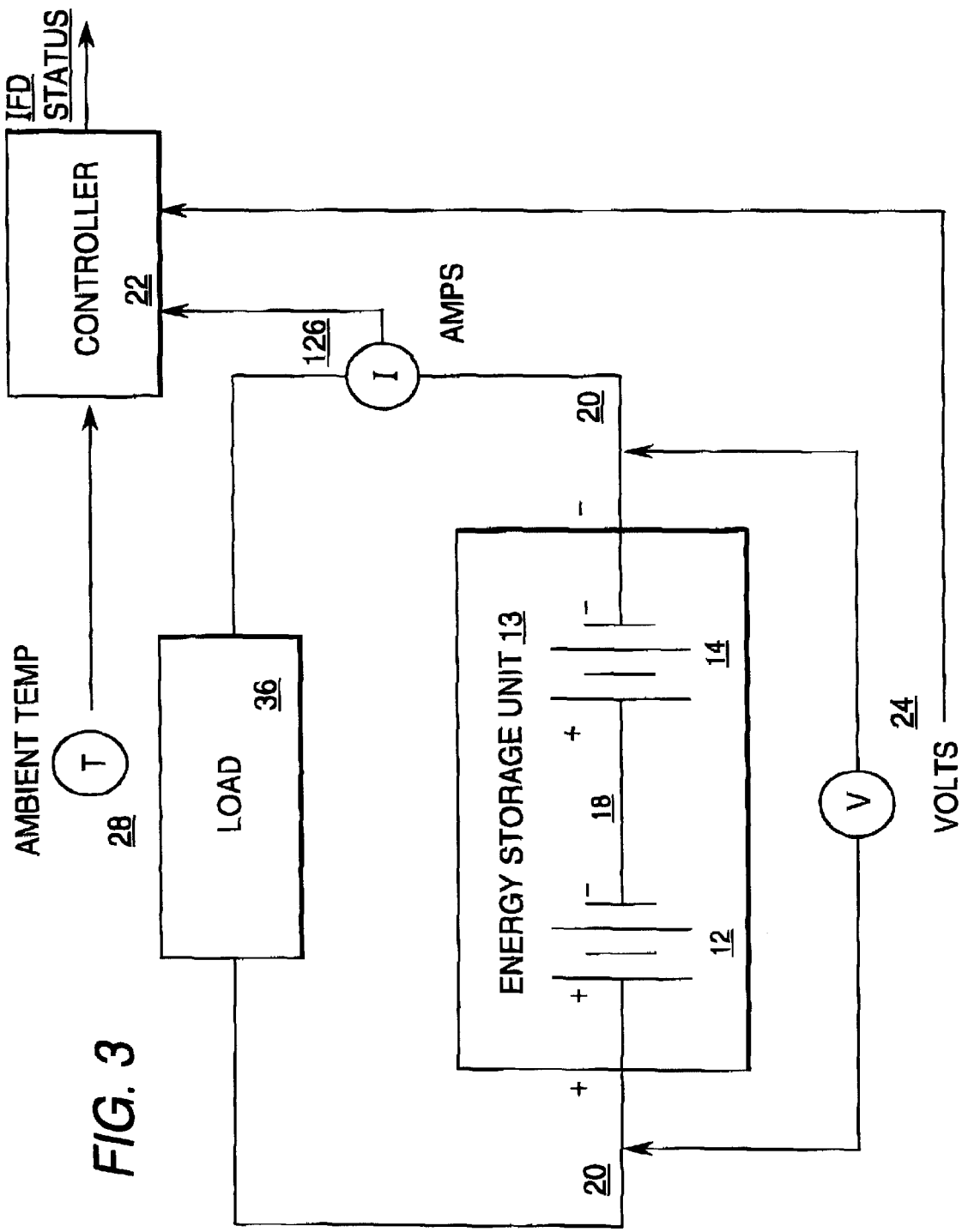
FIG. 3 is a block diagram of another embodiment of the present invention wherein both current and voltage are obtained and used for IFD.

FIG. 3 is a block diagram of another embodiment of the present invention wherein both current and voltage are obtained and used for IFD. The term "energizing," as used herein, is meant to encompass cranking and/or jogging with "cranking" referring to cranking/starting the engine and "jogging" referring to driving the locomotive at low speed (such as about 3 mph) from the energy storage unit without starting the engine.

In the embodiment of FIG. 3, prior to energizing the engine, under conditions of low battery discharge current, pre-energized current sample values of the energy storage unit are obtained, from current sensor 126, for example, and pre-energized voltage sample values are obtained from voltage sensor 24. In one embodiment, current sample values and voltage sample values are obtained substantially simultaneously. Controller 22 is used to calculate average values of the pre-energized current sample values and the pre-energized voltage sample values. In another embodiment wherein current sensor 126 is not required, the current is derived from a measured phase current from an inverter of the locomotive cranking motor (inverter 19 is shown in FIG. 1) or traction motor during engine cranking or locomotive jogging.

While energizing the engine, energized current and voltage sample values are obtained. Controller 22 is used to calculate average values of the energized current sample values and the energized voltage sample values. The controller then subtracts the average value of the pre-energized current from the average value of the energized current to calculate a delta current value and subtracts the average value of the pre-energized voltage from the average value of the energized voltage to calculate a delta voltage value. Then the delta voltage value is divided by the delta current value to calculate an effective impedance which can be used to predict incipient failure of the locomotive energy storage unit or energy storage unit cabling. As discussed above, the prediction methods can be based on thresholds or trending, for example.

Figure 4:
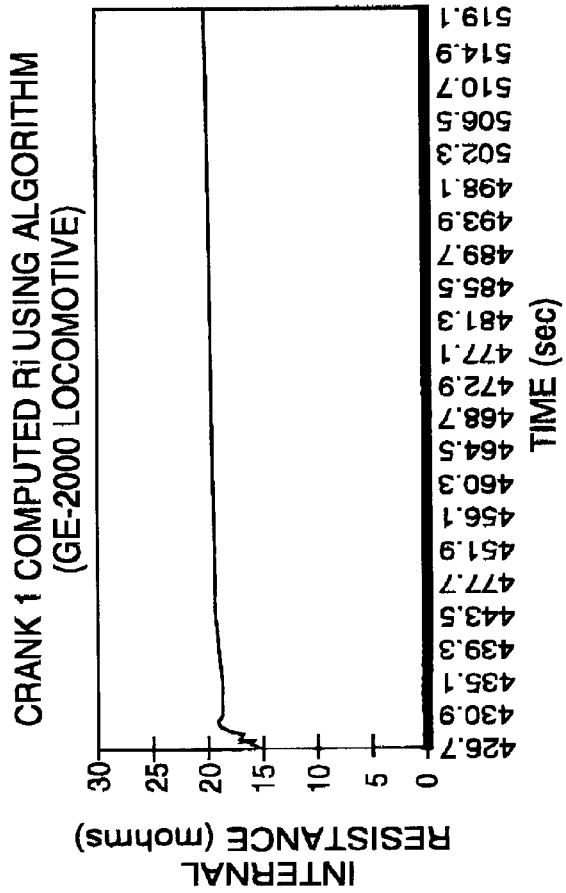
FIGS. 4–5 are graphs illustrating waveforms obtained using the embodiment of FIG. 3.
Figure 5:
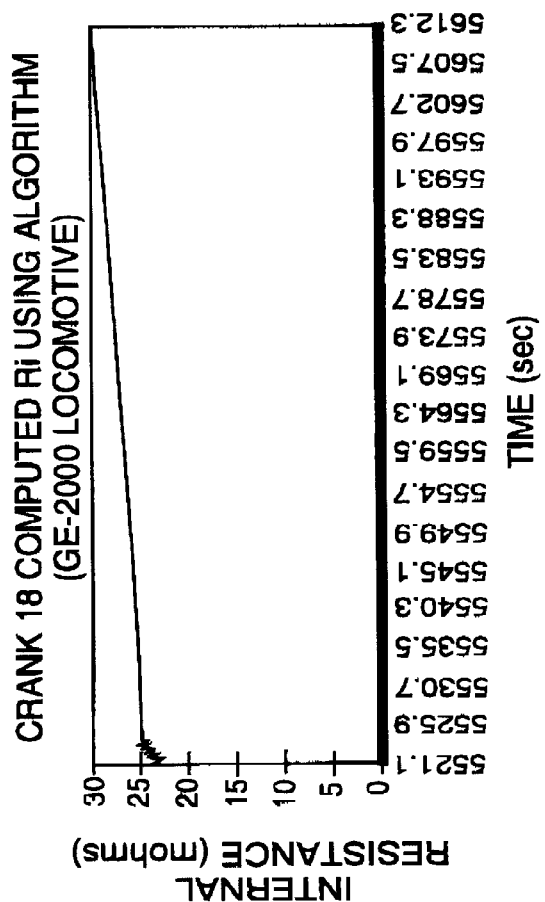

FIGS. 4–5 are graphs illustrating waveforms obtained using the embodiment of FIG. 3 during a locomotive crank sequence (with fuel injectors disabled) using a data acquisition system, an energy storage unit current sensor 126 and a battery voltage sensor 24.

FIG. 4 illustrates the "effective" resistance, or the computed locomotive battery internal resistance Ri obtained from controller 22 after the first locomotive engine crank was performed using a two year old locomotive battery. Prior to the engine crank test, the locomotive battery was initially charged from the onboard locomotive battery charger (shown as charger 16 in FIG. 1) until the battery was considered "fully charged". After an initial five second period, the computed impedance $R_i$ had a slight positive slope as the battery is being discharged during cranking.

FIG. 5 illustrates the results of the "effective" resistance $R_i$ after the eighteenth successive engine crank. Again, after the initial five seconds, the value of the "effective" resistance $R_i$ increased in magnitude compared to the results in FIG. 4 and the slope of $R_i$ increased substantially.

Setting a predetermined threshold value for the computed $R_i$ and measuring the relative slope of $R_i$ versus time can be used to incipiently predict the number of additional crank sequences available until the battery will not successfully crank the locomotive.

Figure 6:
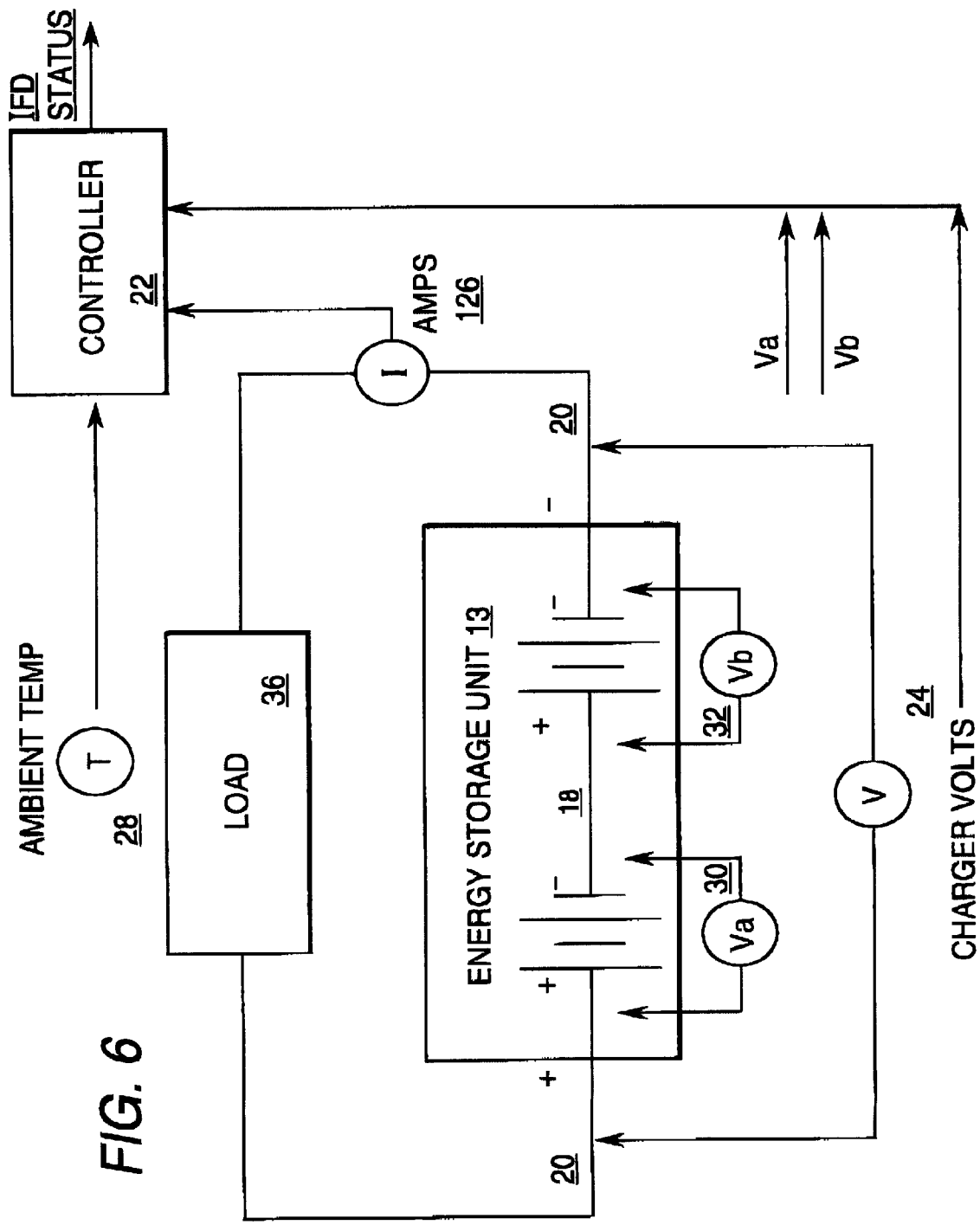
FIG. 6 is a block diagram of an embodiment of the present invention similar to that of FIG. 3 with additional voltage sensors.

FIG. 6 is a block diagram of an embodiment of the present invention similar to that of FIG. 3 with additional voltage sensors 30 and 32. In this embodiment, energy storage unit 13 includes at least two individual energy storage units 12 and 13.

During cranking, additional voltage sensors 30 and 32 are used to obtain individual voltage sample values of each of the individual energy storage units. Controller 22 uses these sample values to calculate individual average values of the individual voltage sample values. The individual average values are then used to estimate the impedances of the cabling and the energy storage units and predict whether an incipient failure is in the cabling or in one or both of the individual energy storage units.

The above embodiments will permit the railroads to monitor the relative health of the locomotive energy storage unit and associated interface cabling and connectors to predict when either electrical maintenance or replacement of an energy storage unit or interface cabling are recommended during the next scheduled ninety-two day inspection period in order to avoid a potential costly mission failure in the locomotive.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for predicting incipient failure in an energy storage unit, the method comprising:
    obtaining charge current sample values of the energy storage unit during energy storage unit charging at a predetermined rate for a predetermined period of time;
    calculating an average value of the charge current sample values; and
    using the average value of the charge current sample values to predict incipient failure in the energy storage unit.

2. The method of claim 1 wherein using the average value of the charge current sample values to predict incipient failure in the energy storage unit includes comparing the average value of the charge current sample values with at least one predetermined threshold value.

3. The method of claim 1 wherein using the average value of the charge current sample values to predict incipient failure in the energy storage unit includes trending successive average values of the charge current sample values.

4. The method of claim 1 wherein the predetermined rate comprises a sampling rate of about 1 Hz.

5. The method of claim 4 wherein the predetermined period of time comprises about 10 seconds.

6. The method of claim 1 wherein the incipient failure is predicted in a locomotive, and, further including, prior to obtaining charge current sample values of the energy storage unit during energy storage unit charging at a predetermined rate for a predetermined period of time, starting an engine of the locomotive.

7. A method for predicting incipient failure in an energy storage unit, the method comprising:
    obtaining crank voltage sample values of the energy storage unit during loading of the energy storage unit;
    calculating an average value of the crank voltage sample values; and
    using the average value of the crank voltage sample values to predict incipient failure in the energy storage unit.

8. The method of claim 7 wherein using the average value of the crank voltage sample values to predict incipient failure in the energy storage unit includes comparing the average value of the crank voltage sample values with at least one predetermined value.

9. The method of claim 7 further including obtaining at least one ambient temperature sample value during loading and using the at least one ambient temperature sample value to adjust the crank voltage sample values.

10. The method of claim 7 wherein using the average value of the crank voltage sample values to predict incipient failure in the energy storage unit includes calculating a standard deviation of the crank voltage sample values and trending the average value and the standard deviation of the crank voltage sample values over a number of loading sequences for failure prediction.

11. The method of claim 10 wherein trending the average value and the standard deviation of the crank voltage sample values includes using regression analysis.

12. The method of claim 7 wherein the incipient failure is predicted in a locomotive and wherein obtaining crank voltage sample values of the energy storage unit during loading of the energy storage unit comprises obtaining crank voltage sample values of the energy storage unit during cranking of an engine of the locomotive.

13. A method for predicting incipient failure in an energy storage unit, the method comprising:
    prior to energizing, obtaining pre-energized current sample values and voltage sample values of the energy storage unit;
    calculating average values of the pre-energized current sample values and the pre-energized voltage sample values;
    while energizing, obtaining energized current sample values and voltage sample values of the energy storage unit;
    calculating average values of the energized current sample values and the energized voltage sample values;
    subtracting the average value of the pre-energized current sample values from the average value of the energized current sample values to calculate a delta current value;
    subtracting the average value of the pre-energized voltage sample values from the average value of the energized voltage sample values to calculate a delta voltage value;
    dividing the delta voltage value by the delta current value to calculate an effective impedance; and
    using the effective impedance to predict incipient failure in the energy storage unit.

14. The method of claim 13 wherein using the effective impedance to predict incipient failure in the energy storage unit comprises comparing the effective impedance with a predetermined maximum impedance.

15. The method of claim 13 wherein using the effective impedance to predict incipient failure in the energy storage unit comprises obtaining and trending successive values of the effective impedance.

16. The method of claim 13 wherein energizing comprises cranking an engine of a locomotive or jogging the locomotive.

17. The method of claim 13 wherein the energy storage unit includes at least two individual energy storage units and further including,
    during energizing, obtaining individual voltage sample values of each of the at least two energy storage units and calculating individual average values of the individual voltage sample values; and using the individual voltage sample values to determine a location of a predicted incipient failure.

18. A system for predicting incipient failure in an energy storage unit, the system comprising:
a current sensor for obtaining charge current sample values of the energy storage unit; and
a controller for
collecting the charge current sample values during energy storage unit charging at a predetermined rate for a predetermined period of time,
calculating an average value of the charge current sample values, and
using the average value of the charge current sample values to predict incipient failure in the energy storage unit.

19. The system of claim 18 wherein the controller uses the average value of the charge current sample values to predict incipient failure in the energy storage unit by comparing the average value of the charge current sample values with at least one predetermined threshold value.

20. The system of claim 18 wherein the controller uses the average value of the charge current sample values to predict incipient failure in the energy storage unit by trending successive average values of the charge current sample values.

21. The method of claim 18 wherein the incipient failure is predicted in a locomotive.

22. A system for predicting incipient failure in an energy storage unit, the system comprising:
a voltage sensor for obtaining crank voltage sample values of the energy storage unit; and
a controller for
collecting the crank voltage sample values during loading of the energy storage unit,
calculating an average value of the crank voltage sample values, and
using the average value of the crank voltage sample values to predict incipient failure in the energy storage unit.

23. The system of claim 22 wherein the controller uses the average value of the crank voltage sample values to predict incipient failure in the energy storage unit by comparing the average value of the crank voltage sample values with at least one predetermined value.

24. The system of claim 22 further including an ambient temperature sensor for obtaining ambient temperature sample values, and wherein the controller is adapted to collect at least one ambient temperature sample value during loading and use the at least one ambient temperature sample value to adjust the crank voltage sample values.

25. The system of claim 22 wherein the controller uses the average value of the crank voltage sample values to predict incipient failure in the energy storage unit by calculating a standard deviation of the crank voltage sample values and trending the average value and the standard deviation of the crank voltage sample values over a number of loading sequences for failure prediction.

26. The method of claim 22 wherein the incipient failure is predicted in a locomotive and wherein the controller is adapted for collecting the crank voltage sample values during cranking of an engine of the locomotive.

27. A system for predicting incipient failure in an energy storage unit, the system comprising:
a current sensor for sensing current sample values of the energy storage unit;
a voltage sensor for sensing voltage sample values of the energy storage unit; and
a controller for
obtaining pre-energized current sample and voltage sample values of the energy storage unit from the current and voltage sensors,
calculating average values of the pre-energized current sample values and the pre-energized voltage sample values,
obtaining energized current sample and voltage sample values of the energy storage unit from the current and voltage sensors,
calculating average values of the energized current sample values and the energized voltage sample values,
subtracting the average value of the pre-energized current sample values from the average value of the energized current sample values to calculate a delta current value,
subtracting the average value of the pre-energized voltage sample values from the average value of the energized voltage sample values to calculate a delta voltage value,
dividing the delta voltage value by the delta current value to calculate an effective impedance, and
using the effective impedance to predict incipient failure in the energy storage unit.

28. The system of claim 27 wherein the controller uses the effective impedance to predict incipient failure in the energy storage unit by comparing the effective impedance with a predetermined maximum impedance.

29. The system of claim 27 wherein the controller uses the effective impedance to predict incipient failure in the energy storage unit by obtaining and trending successive values of the effective impedance.

30. The system of claim 27 wherein the energy storage unit includes at least two individual energy storage units and the voltage sensor comprises a collective voltage sensor and further including,
at least two individual voltage sensors for obtaining respective individual voltage sample values of each of the at least two energy storage units,
wherein the controller is adapted to obtain individual energized voltage sample values of each of the at least two energy storage units, calculate individual average values of the individual voltage sample values, and using the individual voltage sample values to determine a location of a predicted incipient failure.

31. The method of claim 27 wherein the incipient failure is predicted in a locomotive.

32. A system for predicting incipient failure in an energy storage unit, the system comprising:
means for obtaining charge current sample values of the energy storage unit; and
means for collecting the charge current sample values during energy storage unit charging at a predetermined rate of about one Hz for a predetermined period of time of about ten seconds, calculating an average value of the charge current sample values, and for using the average value of the charge current sample values to predict incipient failure in the energy storage unit.

33. A system for predicting incipient failure in an energy storage unit, the system comprising:
means for obtaining crank voltage sample values of the energy storage unit;
means for obtaining at least one ambient temperature sample value of the energy storage unit; and
means for collecting the at least one ambient temperature sample value and the crank voltage sample values during loading of the energy storage unit, using the at least one ambient temperature sample value to adjust the crank voltage sample values, and calculating an average value of the crank voltage sample values, and using the average value of the crank voltage sample values to predict incipient failure in the energy storage unit.

34. A system for predicting incipient failure in an energy storage unit, the system comprising:

means for determining current sample values of the energy storage unit;

means for determining voltage sample values of the energy storage unit; and controller means for obtaining pre-energized current sample and voltage sample values of the energy storage unit from the current and voltage sensors, calculating average values of the pre-energized current sample values and the pre-energized voltage sample values, obtaining energized current sample and voltage sample values of the energy storage unit from the current and voltage sensors, calculating average values of the energized current sample values and the energized voltage sample values, subtracting the average value of the pre-energized current sample values from the average value of the energized current sample values to calculate a delta current value, subtracting the average value of the pre-energized voltage sample values from the average value of the energized voltage sample values to calculate a delta voltage value, dividing the delta voltage value by the delta current value to calculate an effective impedance, and using the effective impedance to predict incipient failure in the energy storage unit.

35. The system of claim 34 wherein the energy storage unit includes at least two individual energy storage units, and further including means for obtaining respective individual voltage sample values of each of the at least two energy storage units, wherein the controller means is adapted to obtain individual energized voltage sample values of each of the at least two energy storage units, calculate individual average values of the individual voltage sample values, and using the individual voltage sample values to determine a location of a predicted incipient failure.

* * * * *